(12) United States Patent
Mundarath et al.

(10) Patent No.: US 8,271,569 B2
(45) Date of Patent: Sep. 18, 2012

(54) TECHNIQUES FOR PERFORMING DISCRETE FOURIER TRANSFORMS ON RADIX-2 PLATFORMS

(75) Inventors: Jayakrishnan C. Mundarath, Austin, TX (US); Leo G. Dehner, Austin, TX (US); Kevin B. Traylor, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1104 days.

(21) Appl. No.: 12/140,890

(22) Filed: Jun. 17, 2008

(65) Prior Publication Data

US 2009/0313314 A1 Dec. 17, 2009

(51) Int. Cl.
*G06F 15/00* (2006.01)
(52) U.S. Cl. .......................................... 708/405; 708/408
(58) Field of Classification Search ................... 708/403, 708/404, 409, 405, 408
See application file for complete search history.

(56) References Cited

U.S. PATENT DOCUMENTS

| | | | |
|---|---|---|---|
| 5,233,551 A | 8/1993 | White | |
| 6,304,887 B1 | 10/2001 | Ju et al. | |
| 6,401,162 B1 | 6/2002 | Nasserbakht | |
| 6,792,441 B2 | 9/2004 | Jaber | |
| 2002/0108026 A1* | 8/2002 | Balmer et al. | 712/218 |
| 2003/0088601 A1* | 5/2003 | Pitsianis et al. | 708/622 |
| 2004/0015530 A1* | 1/2004 | Kang | 708/404 |
| 2004/0078404 A1* | 4/2004 | Macy et al. | 708/400 |
| 2005/0071403 A1* | 3/2005 | Taunton | 708/404 |
| 2005/0198473 A1* | 9/2005 | Ford | 712/221 |

* cited by examiner

*Primary Examiner* — Chuong D Ngo
(74) *Attorney, Agent, or Firm* — Yudell Isidore Ng Russell PLLC

(57) ABSTRACT

A technique for performing a discrete Fourier transform (DFT) includes storing, in a single-port memory, multiple signal points. A first group of consecutive ones of the multiple signal points are fetched (from a first line of the single-port memory) to a first input register associated with a processor that includes multiple arithmetic units (AUs) that are each configured to perform multiply accumulate (MAC) operations. A second group of consecutive ones of the multiple signal points are then fetched (from a second line of the single-port memory) to a second input register associated with the processor. Selected pairs of the multiple signal points are then loaded (one from each of the first and second input registers for each pair) into the multiple arithmetic units during an initial butterfly stage. Radix-2 butterfly operations are then performed on the selected pairs of the multiple signal points (using the multiple AUs) to provide respective output elements.

23 Claims, 14 Drawing Sheets

TECHNIQUES FOR PERFORMING DISCRETE FOURIER TRANSFORMS ON RADIX-2 PLATFORMS

BACKGROUND

1. Field

This disclosure relates generally to techniques for performing discrete Fourier transforms and, more specifically, to techniques for performing discrete Fourier transforms on radix-2 platforms.

2. Related Art

An electrical signal may be represented in the time-domain (as a variable that changes with time) or may be represented in the frequency-domain (as energy at specific frequencies). In the time-domain, a sampled digital signal includes a series of data points that correspond to an original physical parameter, e.g., light, sound, temperature, and velocity. In the frequency-domain, a sampled digital signal is represented as discrete frequency components, e.g., sinusoidal waves. A sampled digital signal may be transformed from the time-domain to the frequency-domain using a discrete Fourier transform (DFT). Conversely, a sampled digital signal may be transformed from the frequency-domain to the time-domain using an inverse DFT (IDFT).

As is well known, a DFT is a digital signal processing transformation that is employed in various applications. DFTs and IDFTs facilitate signal processing in the frequency-domain, which can provide efficient convolution integral computation (which is, for example, useful in linear filtering) and signal correlation analysis. As the direct computation of a DFT requires a relatively large number of arithmetic operations, the direct computation of a DFT is typically not employed in real-time applications. Various fast Fourier transform (FFT) algorithms have been created to perform real-time tasks, such as digital filtering, audio processing, and spectral analysis for speech recognition. In general, FFT algorithms reduce a computational burden such that DFT approaches may be effectively employed for real-time signal processing.

The computational burden associated with a DFT is a measure of the number of calculations required by a DFT algorithm. A typical DFT algorithm starts with a number of input data points and computes a number of output data points. The DFT function is a sum of products, i.e., multiplications to form product terms followed by addition of the product terms to accumulate a sum of products (multiply accumulate (MAC) operations). The direct computation of a DFT may require a relatively large number of MAC operations as the number of input data points (i.e., a size of the DFT) is increased. Moreover, multiplications by twiddle factors tend to greatly increase computational workload. To reduce the computational burden imposed by the computationally intensive DFT, researchers have developed various FFT algorithms in which the number of required mathematical operations is reduced. In one class of FFT algorithms, a computational burden is reduced based on a divide-and-conquer approach. In this class of FFT algorithms, input data are divided into subsets for which the DFT is computed to form partial DFTs. Using this approach, either decimation-in-frequency (DIF) or decimation-in-time (DIT) approaches are employed to divide (decimate) larger calculation tasks into smaller calculation subtasks.

For example, an N-point DFT can be divided into N/2 2-point partial DFTs. The basic 2-point partial DFT is calculated in a computational element known as a radix-2 DIT butterfly or a radix-2 DIF butterfly. A radix-2 butterfly has two inputs and two outputs, and computes a 2-point DFT. For example, an 8-point DFT may be computed using twelve radix-2 butterflies (or butterfly computing elements). As is well known, butterfly computing elements are generally arranged in stages. That is, input data is fed to inputs of butterfly computing elements in one stage, which provides results to inputs of a next stage of butterfly computing elements. For example, to compute an 8-point DFT on a radix-2 platform, four radix-2 butterflies operate in parallel in a first stage to compute eight partial DFTs. The eight partial DFTs (outputs) of the first stage are combined in two additional stages to provide a complete 8-point DFT output. Specifically, a second stage of four radix-2 butterflies and a third stage of four radix-2 butterflies comprise a two stage combination phase in which eight radix-2 butterflies (responsive to eight partial DFTs) form a final 8-point DFT output.

As another example, a 16-point DFT may be computed using thirty-two radix-2 butterflies to compute a 16-point DFT. In this case there are four stages of butterfly calculations. That is, eight radix-2 butterflies operate in parallel in a first stage, where eight 2-point partial DFTs are calculated. Outputs of the first stage are combined in three additional combination stages to form the 16-point DFT output. An output of a second stage of eight radix-2 butterflies is coupled to a third stage of eight radix-2 butterflies. An output of the third stage of eight radix-2 butterflies is coupled to a fourth stage of eight radix-2 butterflies, which provide a final 16-point DFT. As is apparent from the above description, in a butterfly implementation of a DFT, butterfly calculations in different stages cannot be performed in parallel. That is, subsequent stages of butterflies cannot begin calculations until earlier stages of butterflies have completed prior calculations.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
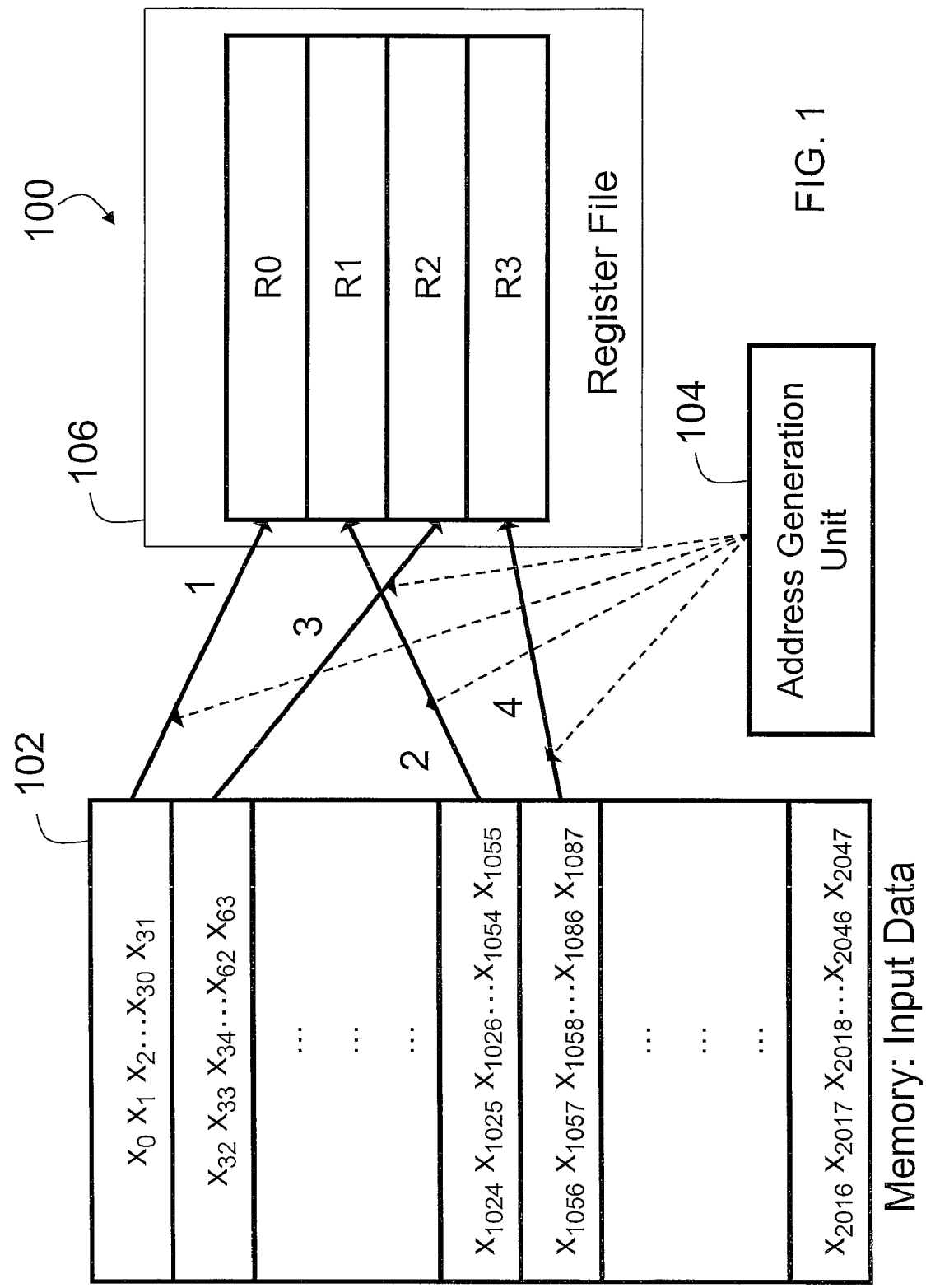
FIG. 1 is a diagram depicting fetching (a portion of) input data from a memory to input registers of a register file (associated with a processor) for a first butterfly stage, according to an embodiment of the present invention.

In the following detailed description of exemplary embodiments of the invention, specific exemplary embodiments in which the invention may be practiced are described in sufficient detail to enable those skilled in the art to practice the invention. It should be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims and their equivalents. In particular, although one embodiment is described below with respect to a wireless communication device that takes the form of a mobile telephone, it will be appreciated that the present invention is not so limited and may be embodied in other electronic devices.

According to various aspects of the present disclosure, efficient discrete Fourier transform (DFT) implementations for a parallel processor (e.g., a digital signal processor (DSP)) architecture, which includes multiple arithmetic units (AUs) are disclosed. The disclosed implementations simultaneously exploit a pipelined architecture and multiple arithmetic units (AUs) to facilitate relatively high efficiencies in computing DFT outputs. The disclosed techniques are compatible with architectures that employ a single-port memory (e.g., a dynamic random access memory (DRAM). When an input sequence size is a multiple of two, an efficient radix-2 DFT (e.g., a fast Fourier transform (FFT)) implementation is employed. In various embodiments, a DSP platform is optimized for radix-2 operations. However, the disclosed radix-2 platform may also efficiently perform mixed radix operations on N-point DFTs that include one or more prime factors in addition to $2^n$ factors (where n is equal to 1, 2, 3, . . . ), which facilitates hardware reuse for mixed radix DFTs.

In general, prior radix-2 processor platforms have not generalized for non-radix-2 algorithms and have not efficiently utilized implemented hardware for mixed radix and different FFT sizes. Moreover, known DSP platforms have generally been limited to decimation-in-frequency (DIF) implementations of an FFT algorithm, as contrasted with a DSP platform constructed according to the present disclosure which is capable of efficiently implementing both decimation-in-time (DIT) and DIF versions of an FFT algorithm.

As one example, a radix-2 FFT algorithm for a hardware processor that includes K complex multiply accumulate (MAC) units may communicate with a memory whose lines include M entries. In this case, K and M are assumed to be multiples of two in order to optimize the hardware platform for radix-2 operations. For example, M may correspond to thirty-two and K may correspond to sixteen (which facilitates K/2 parallel butterfly operations). In general, the disclosed techniques may be considered a combination of pipelining and parallel arithmetic operations. According to another aspect, a K parallel AU architecture may be employed to perform radix-3 butterflies for DFT sizes that have a factor of two. In this case, instead of completing a 3-point butterfly for each set of three inputs, a first output leg of a 3-point butterfly is computed for K sets of inputs and K outputs are ready after three cycles. As the number of 3-point butterflies is assumed to be a power of two, the utilization of the AUs may be maintained at substantially one-hundred percent. While the only mixed radix cases discussed herein is a radix-3 case, it should be readily appreciated that the disclosed processor platform may be extended to virtually any DFT that includes one or more prime factors, as well as a factor of $2^n$.

In general, the techniques disclosed herein may be generalized to virtually any FFT/DFT platform that employs a single-port memory architecture. Unlike known approaches, the disclosed techniques exploits both parallelism available in a multiplicity of AUs and a pipelined instruction set architecture (ISA) that efficiently utilizes hardware. Moreover, unlike known approaches, the disclosed techniques facilitate efficient implementation of prime factor DFTs (e.g., radix-3, radix-5, etc.) on a radix-2 optimized platform. As noted above, the disclosed techniques support both DIT and DIF versions of FFT/DFT algorithms. In general, efficient implementation of FFT/DFT algorithms is desirable to achieve performance goals of fourth generation products, such as third-generation partnership project long-term evolution (3GPP-LTE) subscriber stations (SSs) and base stations (BSs), which are required to be on-the-fly configurable to handle a wide variety of N-point DFTs. In general, the disclosed techniques facilitate efficient implementation of DFTs on relatively low-cost processor (e.g., DSP) platforms that employ a single-port memory.

According to various aspects of the present disclosure, techniques are disclosed that map radix-2/mixed radix FFT/DFT operations onto hardware with the goal of utilizing the hardware with near one-hundred percent efficiency, so as to provide efficient FFT/DFT implementations with reduced hardware complexity. In the discussion below, details of a radix-2 FFT approach are provided for a processor containing K complex MAC units. In various embodiments, a processor platform is optimized for radix-2 operations, i.e., each memory line contains M entries, where K and M are assumed to be multiples of two. For example, K may be equal to sixteen and M may be equal to thirty-two.

In one embodiment, eight complex butterflies are performed in parallel on input data provided from a single-port memory. The disclosed techniques facilitate efficient parallelization of memory fetches, register loading, butterflies, and memory stores and employ special multiplexing modes for loading the AU source registers according to a stage of FFT operation. In one embodiment, each memory line contains thirty-two complex numbers (e.g., each including sixteen bits for a real value and sixteen bits for a complex value). Dynamic address generation is employed to fetch data from the memory during the different stages of FFT operation (offsets are generated differently for each stage), based on a value of a selected N-point DFT. It should be appreciated that a control unit (e.g., included in an address generation unit (AGU)) may select and execute different microcode for different N-point DFTs. For a DIF implementation, multiple AU source load multiplexing modes are implemented to support: butterfly inputs from different registers during one or more initial butterfly stages; butterfly inputs from within the same register during one or more intermediate butterfly stages; and butterfly inputs that are adjacent to each other in a final butterfly stage. For a DIT implementation, multiple AU source load multiplexing modes are implemented to support: butterfly inputs that are adjacent to each other in an initial butterfly stage; butterfly inputs from within the same register during one or more intermediate butterfly stages; and butterfly inputs from different registers during one or more final butterfly stages. In one disclosed embodiment, the various multiplexing modes allow eight butterfly operations to proceed in parallel. For a DIF implementation, multiple AU output storage multiplexing modes support: AU outputs going to different output registers in one or more initial butterfly stages; and AU outputs going to different locations within a same output register in one or more later butterfly stages. For a DIT implementation, multiple AU output storage multiplexing modes support: AU outputs going to different locations within a same output register in one or more initial butterfly stages; and AU outputs going to different output registers in one or more later butterfly stages. In various disclosed embodiments, all output multiplexing modes write sixteen outputs (two for each of eight butterfly operations) in parallel.

According to one aspect of the present disclosure, a technique for performing a discrete Fourier transform (e.g., a fast Fourier transform (FFT)) on a radix-2 platform includes storing, in a single-port memory, multiple signal points. A first group of consecutive ones of the multiple signal points are then fetched, from a first line of the single-port memory, to a first input register associated with a processor (e.g., a digital signal processor (DSP)). In this case, the processor includes multiple arithmetic units that are each configured to perform multiply accumulate operations. A second group of consecutive ones of the multiple signal points are also fetched, from a second line of the single-port memory, to a second input register associated with the processor. Selected pairs of the multiple signal points are loaded into the multiple arithmetic units during an initial butterfly stage. In this case, each of the selected pairs includes one of the multiple signal points from the first input register and one of the multiple signal points from the second input register. Butterfly operations are then performed on the selected pairs of the multiple signal points using the multiple arithmetic units to provide respective first output elements during the initial butterfly stage. In at least one embodiment, the radix-2 platform is configured as a decimation-in-frequency implementation.

According to another aspect of the present disclosure, a technique for performing a discrete Fourier transform (e.g., a fast Fourier transform (FFT)) on a radix-2 platform includes storing, in a single-port memory, multiple signal points. A first group of consecutive ones of the multiple signal points are then fetched, from a first line of the single-port memory, to a first input register associated with a processor (e.g., a digital signal processor (DSP)). In this case, the processor includes multiple arithmetic units that are each configured to perform multiply accumulate operations. A second group of consecutive ones of the multiple signal points are also fetched, from a second line of the single-port memory, to a second input register associated with the processor. Selected pairs of the multiple signal points are loaded, from adjacent locations in the first input register, into the multiple arithmetic units during an initial butterfly stage. Selected pairs of the multiple signal points are loaded, from adjacent locations in the second input register, into the multiple arithmetic units during the initial butterfly stage. Butterfly operations are performed on the selected pairs of the multiple signal points using the multiple arithmetic units to provide respective first output elements during the initial butterfly stage. In at least one embodiment, the radix-2 platform is configured as a decimation-in-time implementation.

According to another aspect of the present disclosure, a technique for performing a discrete Fourier transform (e.g., a fast Fourier transform (FFT)) on a radix-2 platform includes storing, in a single-port memory, multiple signal points. A first group of consecutive ones of the multiple signal points is then fetched, from the single-port memory, to a first input register associated with a processor (e.g., a digital signal processor (DSP)). In this case, the processor includes multiple arithmetic units that are each configured to perform multiply accumulate operations. A second group of consecutive ones of the multiple signal points are also fetched, from the single-port memory, to a second input register associated with the processor. Selected pairs of the multiple signal points are loaded into the multiple arithmetic units during a butterfly stage. In this case, each of the selected pairs includes one of the multiple signal points from the first input register and one of the multiple signal points from the second input register. Butterfly operations are performed on the selected pairs of the multiple signal points using the multiple arithmetic units to provide respective first output elements during the initial butterfly stage. The butterfly stage corresponds to one or more initial butterfly stages having one or more subsequent butterfly stages when the radix-2 platform is configured as a decimation-in-frequency implementation or one or more final butterfly stages having one or more prior butterfly stages when the radix-2 platform is configured as a decimation-in-time implementation.

With reference to FIG. 1, a diagram 100 depicts some example fetching operations that are performed during a first butterfly stage for a 2048-point DFT that employs a DIF implementation. More specifically, a memory 102 is illustrated that includes thirty-two input data elements in each memory line. While each memory line is illustrated as having thirty-two input data elements, it should be appreciated that the techniques disclosed herein are equally applicable to architectures with memory lines having more or less than thirty-two input data elements. As is also illustrated an address generation unit (AGU) 104 (which, among other functions, dynamically generates addresses and control signals based on a current butterfly stage and a DFT size) is used to fetch lines (by providing appropriate addresses and control signals) from the memory 102 to appropriate input registers in a register file 106 (include within, for example, a processor, e.g., a digital signal processor (DSP)).

As is shown, input data elements $X_0$ through $X_3$, are loaded into input register R0, input data elements $X_{1024}$ through $X_{1055}$ are loaded into input register R1, input data elements $X_{32}$ through $X_{63}$ are loaded into input register R2, and input data elements $X_{1056}$ through $X_{1087}$ are loaded into input register R3 for a first butterfly stage. As is discussed in further detail below, appropriate ones of the elements in the input register R0 are butterflied with appropriate ones of the elements in the input register R1 in the first butterfly stage. Similarly, appropriate ones of the elements in the input register R2 are butterflied with appropriate ones of the elements in the input register R3 in the first butterfly stage.

Figure 2:
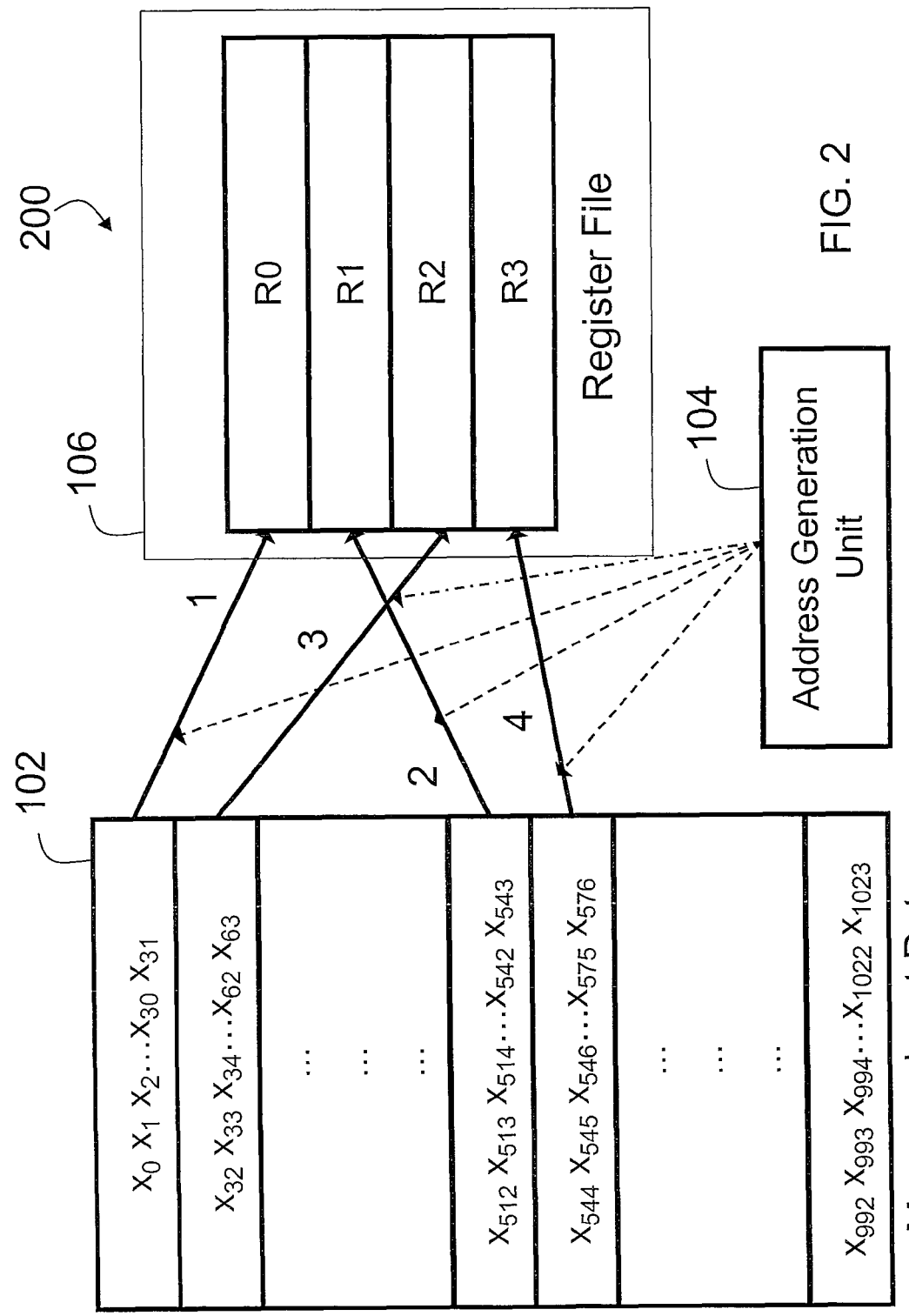
FIG. 2 is a diagram depicting fetching (a portion of) input data (provided as results from the first stage) from the memory to the input registers of the register file (associated with the processor) for a first group of a second butterfly stage, according to an embodiment of the present invention.

With reference to FIG. 2, a diagram 200 depicts some additional example fetching operations that are performed during a second butterfly stage for a first group of the 2048-point DFT. It should be appreciated that the input data elements for the second butterfly stage are provided by the first butterfly stage (i.e., while the designators of the input data elements are the same between stages, values of the input data elements between stages are generally different). As is shown, input data elements $X_0$ through $X_3$, are loaded into input register R0, input data elements $X_{512}$ through $X_{543}$ are loaded into input register R1, input data elements $X_{32}$ through $X_{63}$ are loaded into input register R2, and input data elements $X_{544}$ through $X_{576}$ are loaded into input register R3 for a second butterfly stage. As is discussed in further detail below, appropriate ones of the elements in the input register R0 are butterflied (e.g., eight simultaneously) with appropriate ones of the elements in the input register R1 in the second butterfly stage. Similarly, appropriate ones of the elements in the input register R2 are butterflied with appropriate ones of the elements in the input register R3 in the second butterfly stage.

Figure 3:
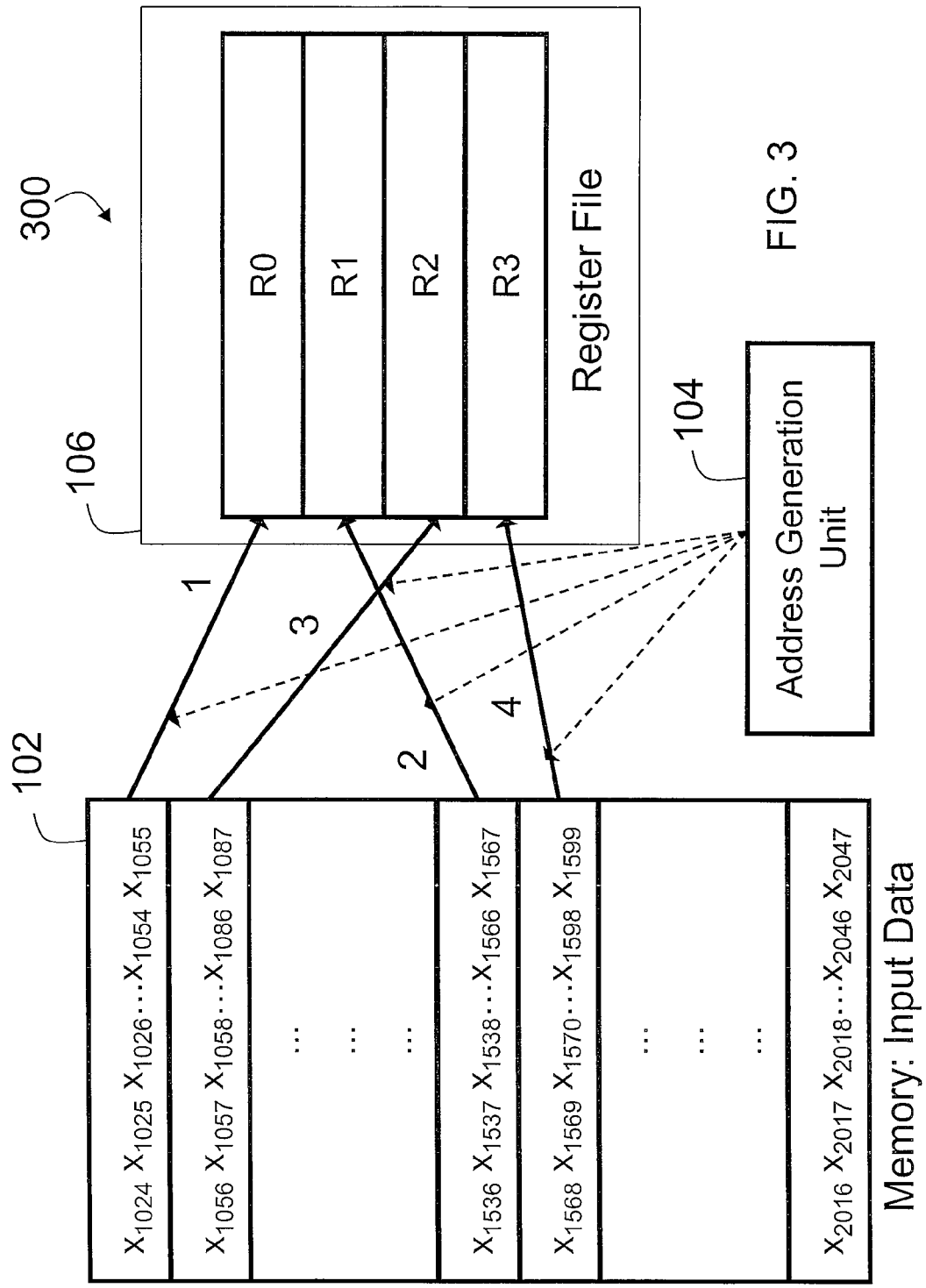
FIG. 3 is a diagram depicting fetching (another portion of) input data (also provided as results from the first stage) from the memory to the input registers of the register file (associated with the processor) for a second group of the second butterfly stage, according to an embodiment of the present invention.

With reference to FIG. 3, a diagram 300 depicts some additional example fetching operations that are performed during the second butterfly stage for a second group of the 2048-point DFT. As is shown, input data elements $X_{1024}$ through $X_{1055}$ are loaded into input register R0, input data elements $X_{1536}$ through $X_{1567}$ are loaded into input register R1, input data elements $X_{1056}$ through $X_{1087}$ are loaded into input register R2, and input data elements $X_{1568}$ through $X_{1599}$ are loaded into input register R3 for the second butterfly stage. As above, appropriate ones of the elements in the input register R0 are butterflied with appropriate ones of the elements in the input register R1 in the second butterfly stage. Similarly, appropriate ones of the elements in the input register R2 are butterflied with appropriate ones of the elements in the input register R3 in the second butterfly stage.

Figure 4:
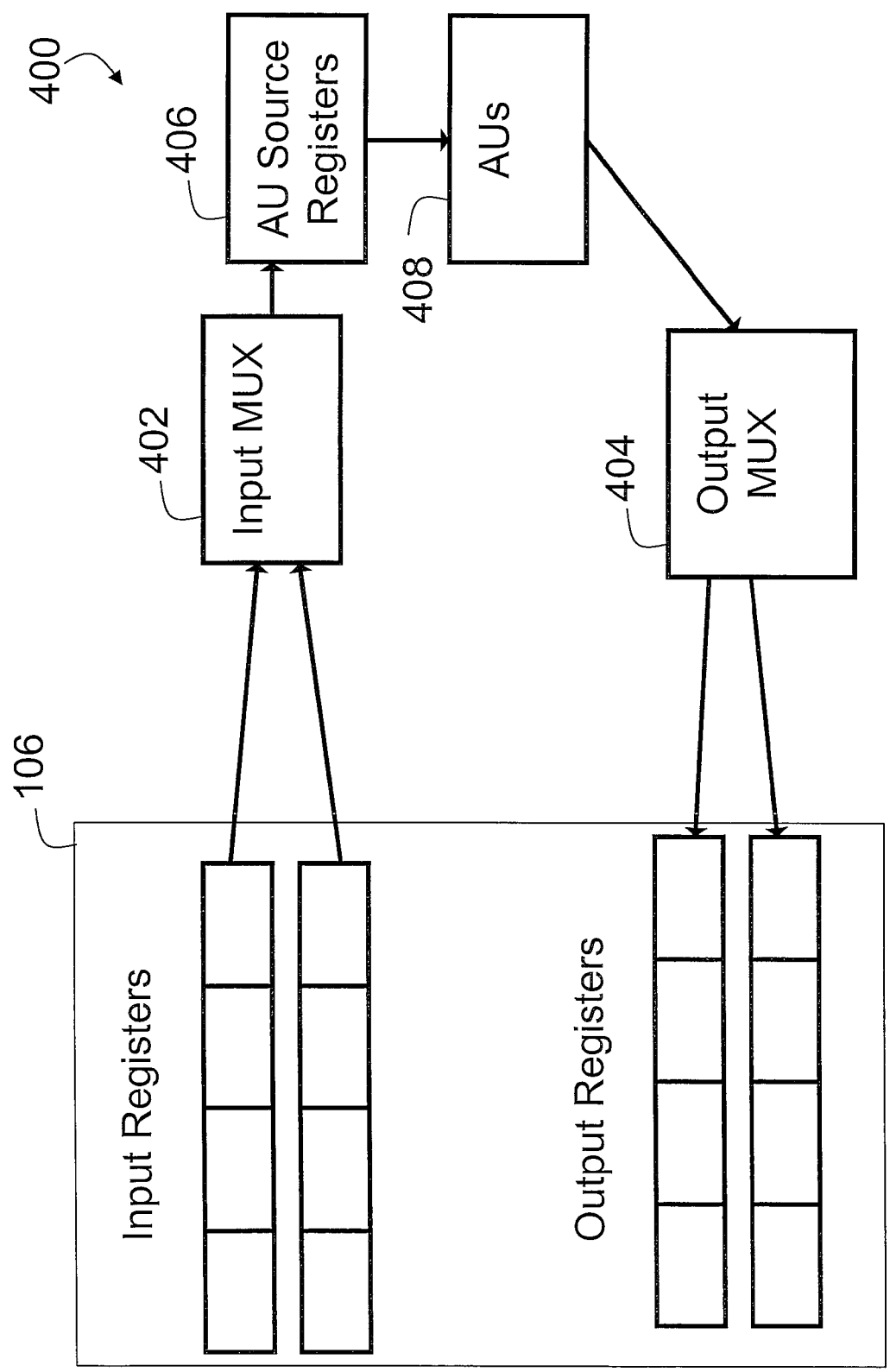
FIG. 4 is a block diagram of a relevant portion of a processor system (e.g., a digital signal processor (DSP) platform) that includes input multiplexers that are configured to select input data pairs (for parallel arithmetic units (AUs)) from different input registers and output multiplexers that are configured to provide result data pairs (from butterfly operations performed by the parallel AUs) to different output registers during one or more early butterfly stages, according to a first mode of one embodiment of the present invention.

With reference to FIG. 4, a relevant portion of a radix-2 platform 400 is illustrated. The platform 400 includes multiple input registers and multiple output registers in the register file 106. For example, the register file 106 may include four input registers and four output registers. An input multiplexer (MUX) 402 selects appropriate input data from the input registers and provides the selected input data to appropriate ones of AU source registers 406. The registers 406 also receive appropriate twiddle factors from a twiddle factor table (not shown in FIG. 4). The registers 406 provide the input data and twiddle factors to the AUs 408, which are configured to perform multiply-accumulate (MAC) operations. For example, the platform 400 may include sixteen AUs which allow the platform 400 to perform eight parallel complex butterfly operations. Results of the butterfly operations are provided to inputs of output multiplexer 404, which is configured to select appropriate locations in the output registers for the results. In a first mode of operation (e.g., for stages 1-6 for a 2048-point DFT DIF implementation), input data pairs are selected from different registers and result pairs are provided to different output registers. For example, for a 2048-point DFT DIF implementation, the following input data pairs (among other input data pairs) are butterflied in consecutive stages: $X_0$ and $X_{1024}$ in a first stage; $X_0$ and $X_{512}$ in a second stage; $X_0$ and $X_{256}$ in a third stage; $X_0$ and $X_{128}$ in a fourth stage; $X_0$ and $X_{64}$ in a fifth stage; $X_0$ and $X_{32}$ in a sixth stage; $X_0$ and $X_{16}$ in a seventh stage; $X_0$ and $X_8$ in an eighth stage; $X_0$ and $X_4$ in a ninth stage; $X_0$ and $X_2$ in a tenth stage; and $X_0$ and $X_1$ in an eleventh stage. It should be noted that for the first through sixth stages, the input data paired with $X_0$ is in a different input register. It should be appreciated that the discussion herein is based on a memory line and input/output registers having a length of thirty-two elements and that virtually any length memory line and input/output registers may be employed in accordance with the techniques disclosed herein. As another example, for a 2048-point DFT DIT implementation, the following input data pairs (among other input data pairs) are butterflied in consecutive stages: $X_0$ and $X_1$ in an first stage; $X_0$ and $X_2$ in a second stage; $X_0$ and $X_4$ in a third stage; $X_0$ and $X_8$ in an fourth stage; $X_0$ and $X_{16}$ in a fifth stage; $X_0$ and $X_{32}$ in a sixth stage; $X_0$ and $X_{64}$ in a seventh stage; $X_0$ and $X_{128}$ in a eighth stage; $X_0$ and $X_{256}$ in a ninth; $X_0$ and $X_{512}$ in a tenth stage; and $X_0$ and $X_{1024}$ in an eleventh stage.

Figure 5:
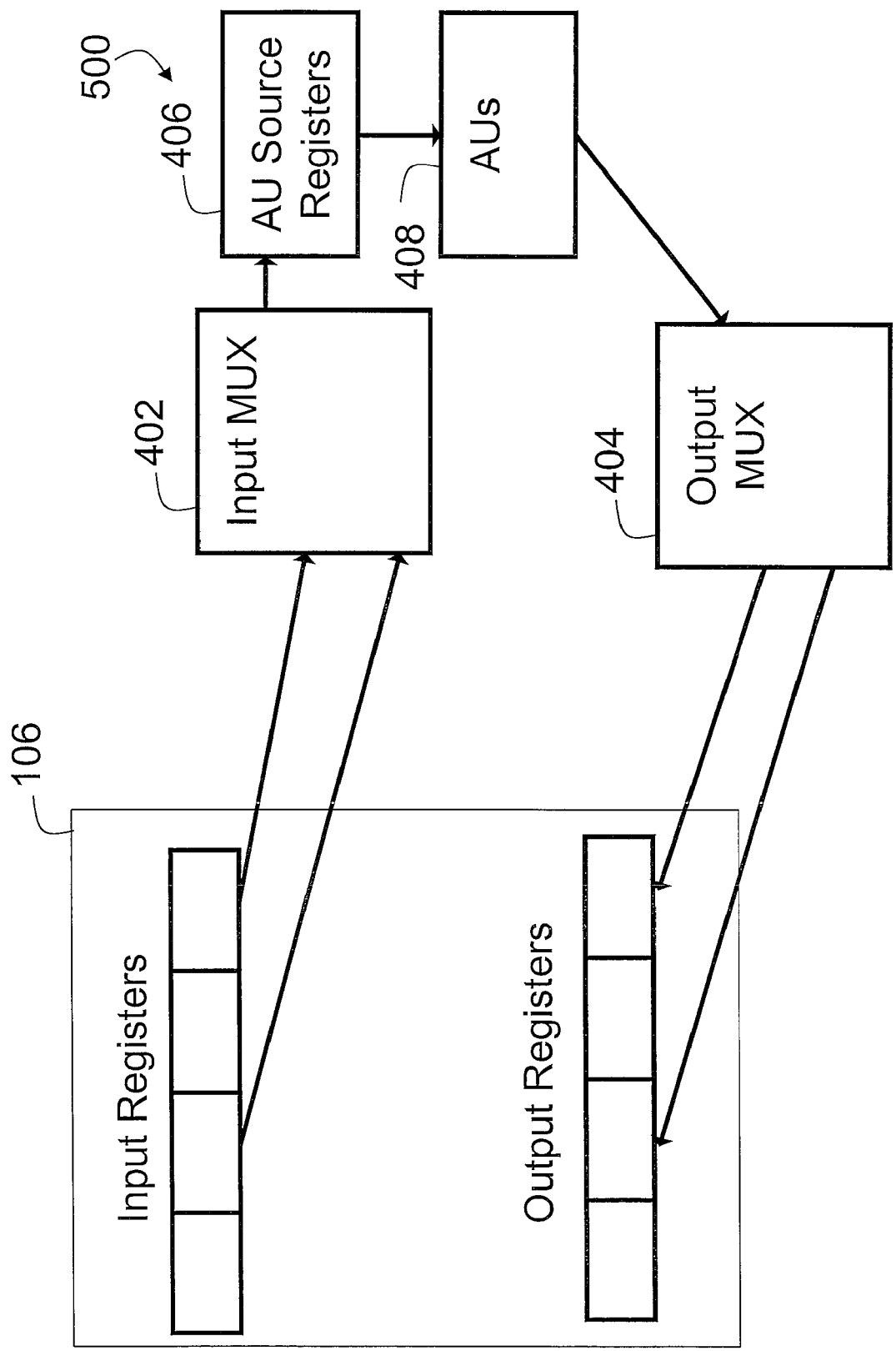
FIG. 5 is a block diagram of a relevant portion of a processor system that includes input multiplexers that select input data pairs for parallel AUs from a same input register and output multiplexers that provide result data pairs from butterfly operations performed by the parallel AUs to a same output register during an intermediate butterfly stage, according to a second mode of one embodiment of the present invention.
Figure 6:
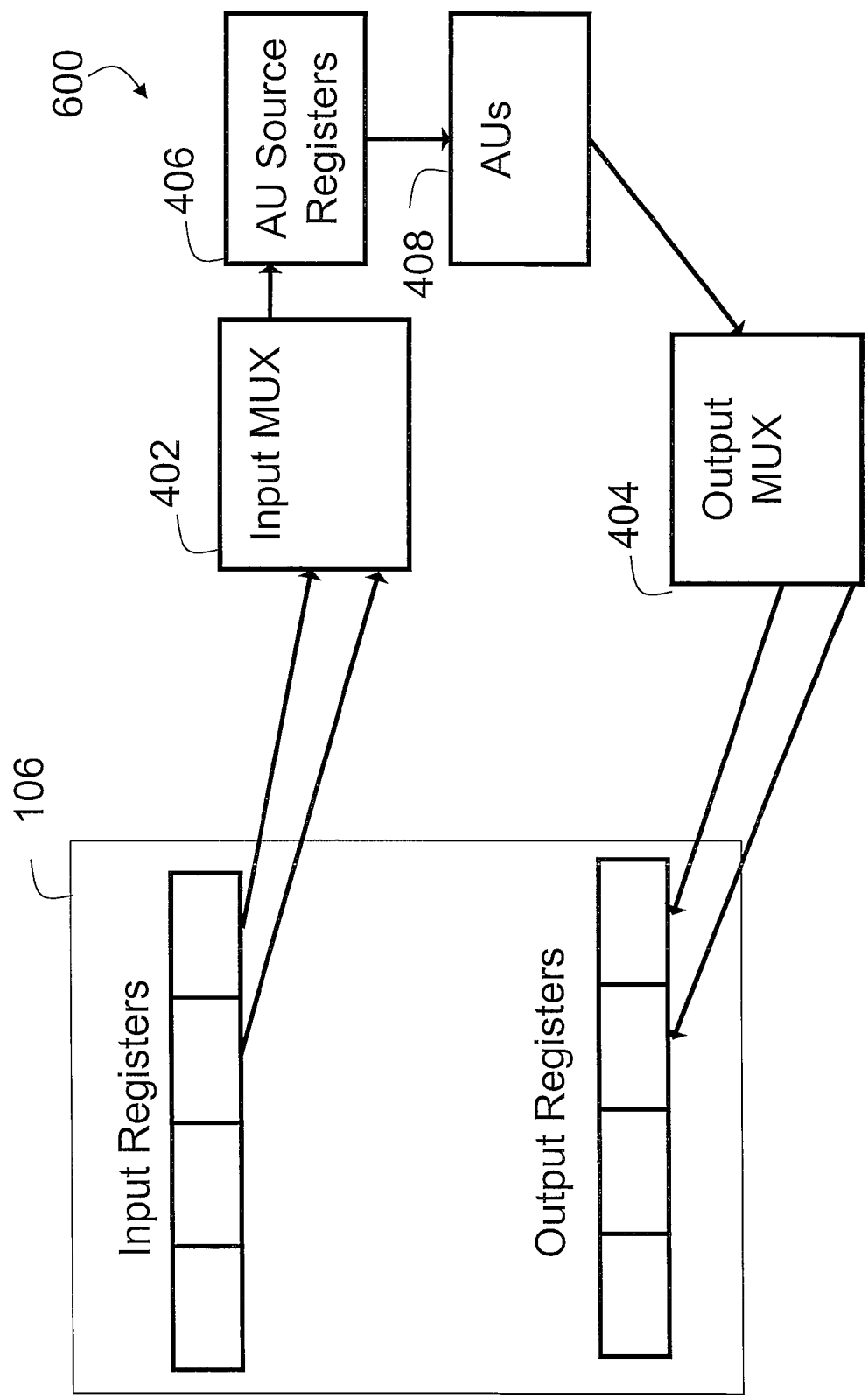
FIG. 6 is a block diagram of a relevant portion of a processor system that includes input multiplexers that select input data pairs for parallel AUs from a same input register and output multiplexers that provide result data pairs from butterfly operations performed by the parallel AUs to a same output register during another intermediate butterfly stage, according to a third mode of one embodiment of the present invention.

With reference to FIG. 5, beginning with the seventh stage 400 for a 2048-point FFT DIF implementation, input data pairs are within a same register. For example, in the seventh stage for a 2048-point FFT DIF implementation, input data pairs (e.g., $X_0$ and $X_{16}$) are sixteen elements apart. In this case, the input MUX 402 is controlled to select data pairs that are sixteen elements apart within a same input register (e.g., $X_1$ and $X_{17}$, $X_2$ and $X_{18}$, $X_3$ and $X_{19}$, etc.). Similarly, the output MUX 404 is controlled to store results to positions that are sixteen elements apart within a same output register. With reference to FIG. 6, in the eighth stage 600 for a 2048-point FFT DIF implementation, input data pairs (e.g., $X_0$ and Xs) are within a same register and are eight elements apart. In this case, the input MUX 402 is controlled to select data pairs that are eight elements apart within a same input register. Similarly, the output MUX 404 is controlled to store results to positions that are eight elements apart within a same output register.

Figure 7:
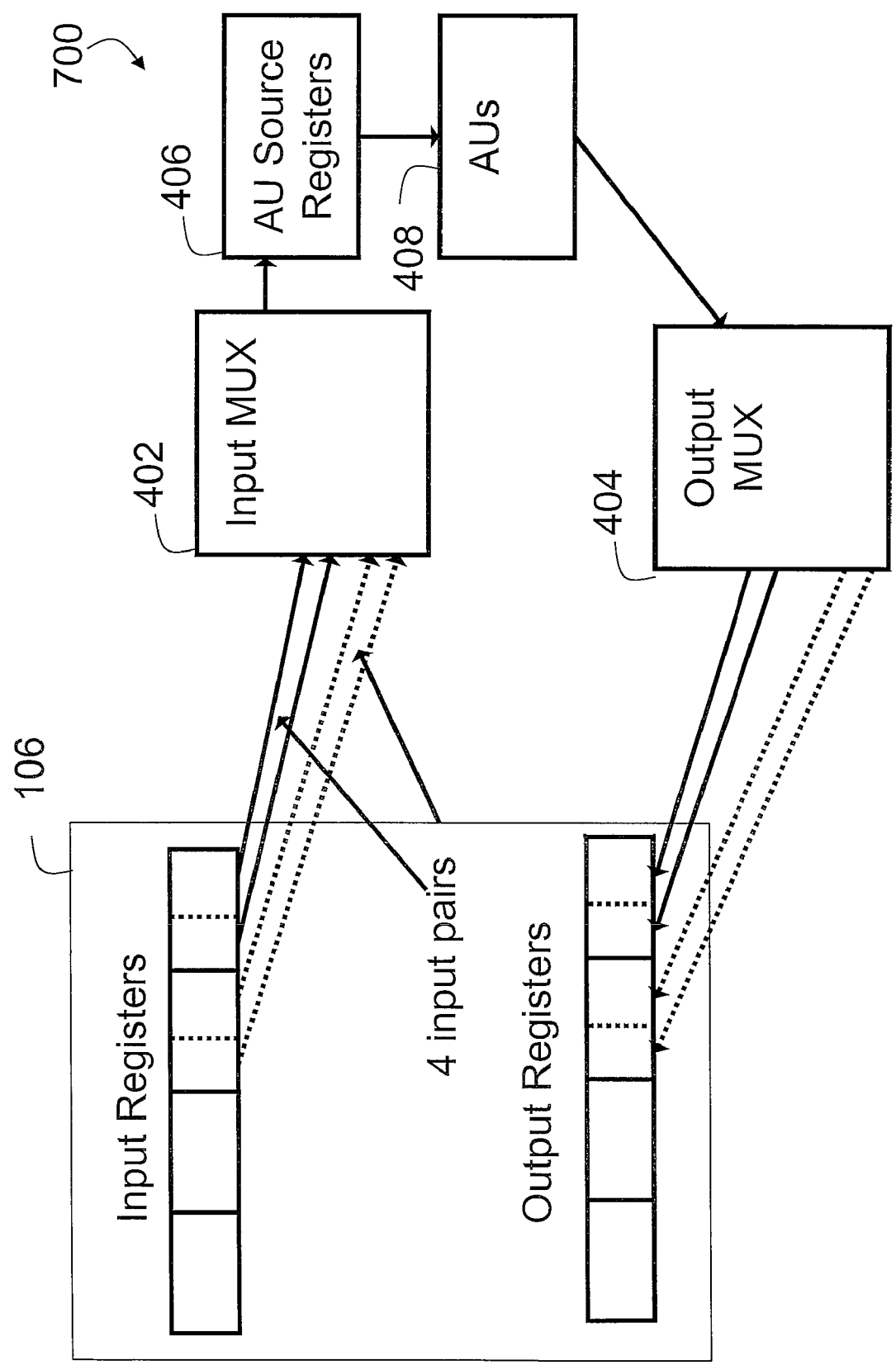
FIG. 7 is a block diagram of a relevant portion of a processor system that includes input multiplexers that select input data pairs for parallel AUs from a same input register and output multiplexers that provide result data pairs from butterfly operations performed by the parallel AUs to a same output register during yet another intermediate butterfly stage, according to a fourth mode of one embodiment of the present invention.
Figure 8:
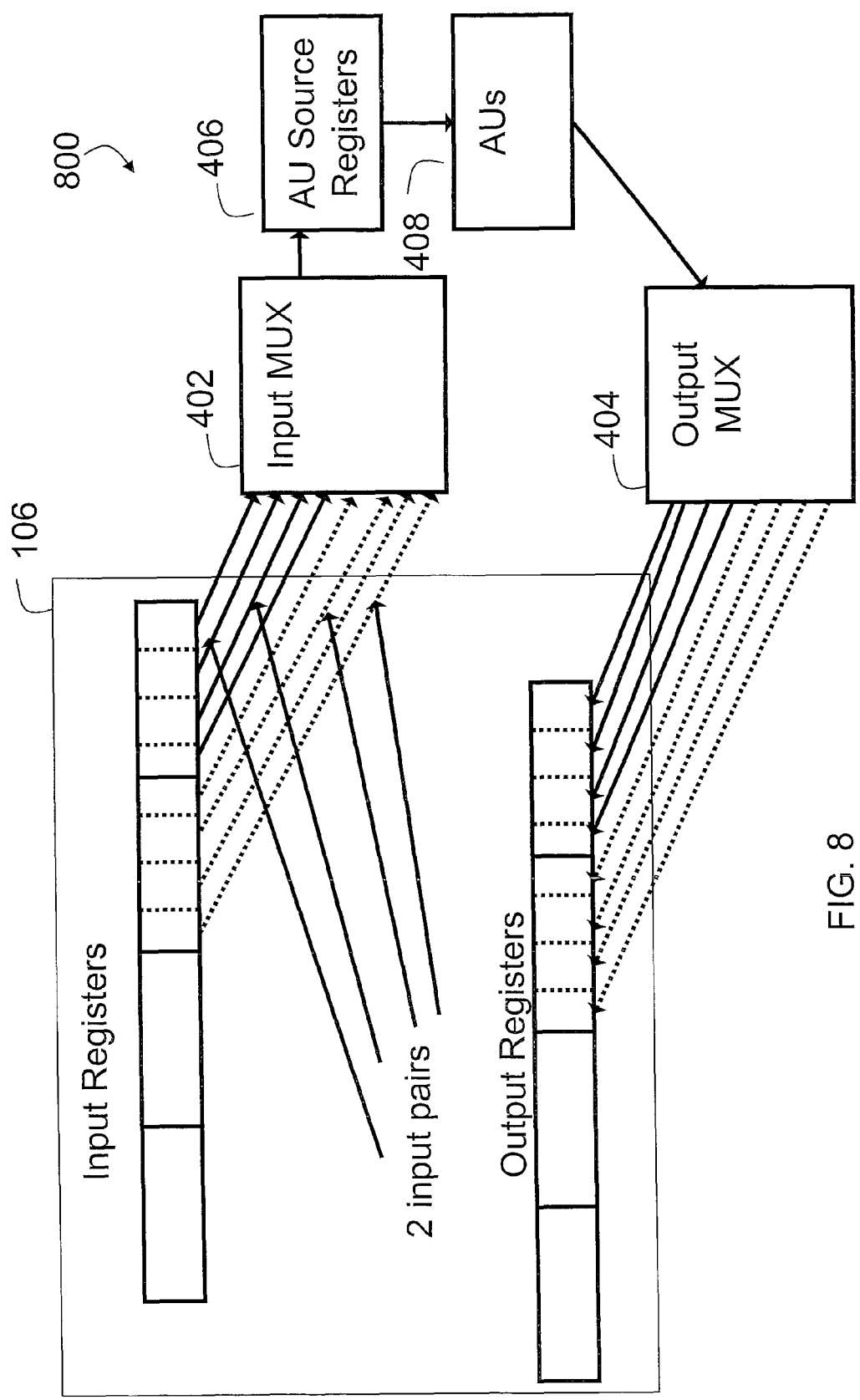
FIG. 8 is a block diagram of a relevant portion of a processor system that includes input multiplexers that select input data pairs for parallel AUs from a same input register and output multiplexers that provide result data pairs from butterfly operations performed by the parallel AUs to a same output register during yet another intermediate butterfly stage, according to a fifth mode of one embodiment of the present invention.
Figure 9:
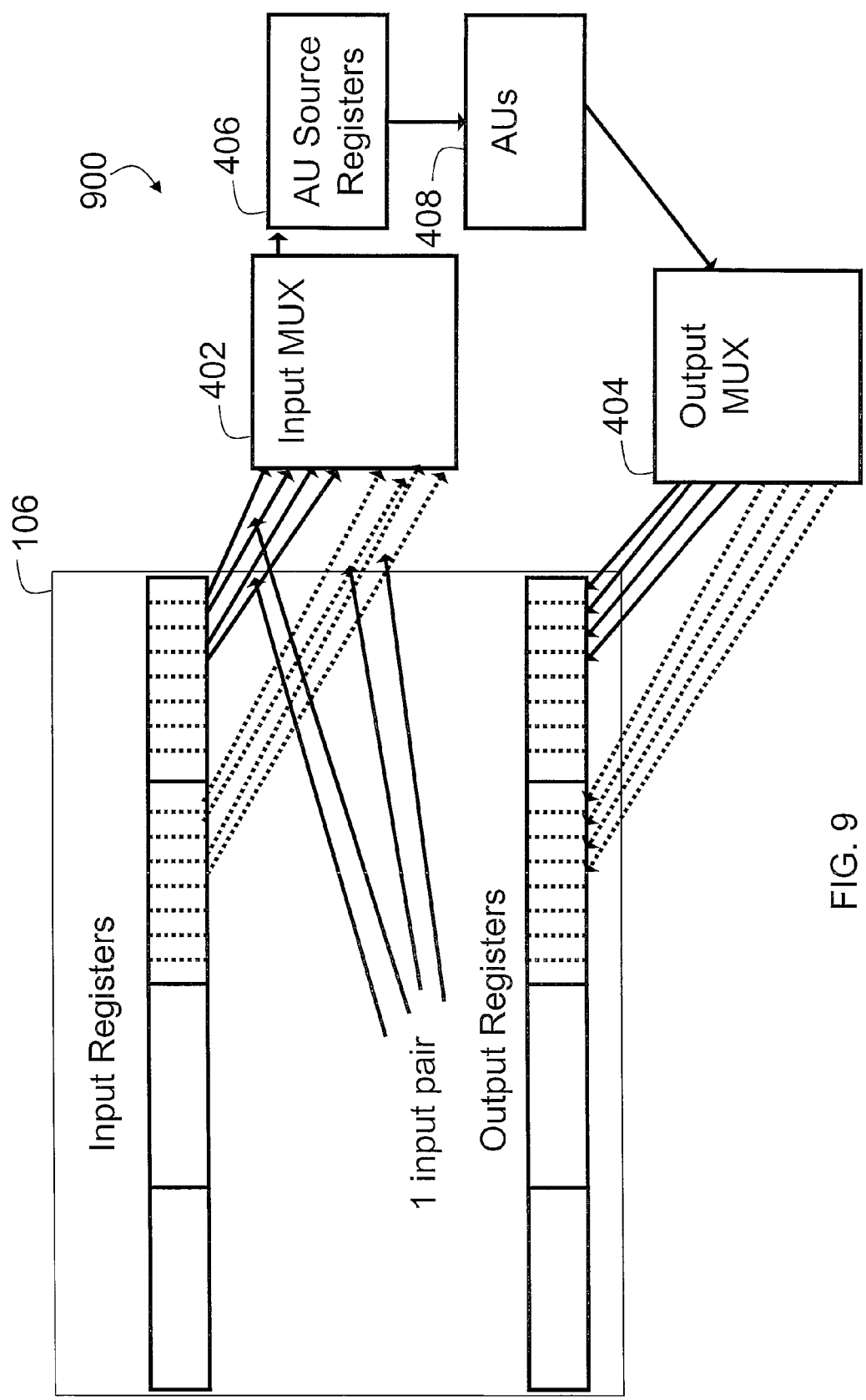
FIG. 9 is a block diagram of a relevant portion of a processor system that includes input multiplexers that select input data pairs for parallel AUs from a same input register and output multiplexers that provide result data pairs from butterfly operations performed by the parallel AUs to a same output register during a final butterfly stage, according to a sixth mode of the present invention.

With reference to FIG. 7, in the ninth stage 700 for a 2048-point FFT DIF implementation, input data pairs (e.g., $X_0$ and $X_4$) are within a same register and are four elements apart. In this case, the input MUX 402 is controlled to select data pairs that are four elements apart within a same input register. Similarly, the output MUX 404 is controlled to store results to positions that are four elements apart within a same output register. With reference to FIG. 8, in the tenth stage 800 for a 2048-point FFT DIF implementation, input data pairs (e.g., $X_0$ and $X_2$) are within a same register and are two elements apart. In this case, the input MUX 402 is controlled to select data pairs that are two elements apart within a same input register. Similarly, the output MUX 404 is controlled to store results to positions that are two elements apart within a same output register. With reference to FIG. 9, in the eleventh stage 900 for a 2048-point FFT DIF implementation, input data pairs (e.g., $X_0$ and $X_1$) are within a same register and are adjacent. In this case, the input MUX 402 is controlled to select data pairs that are adjacent within a same input register. Similarly, the output MUX 404 is controlled to store results to positions that are adjacent within a same output register.

Figure 10:
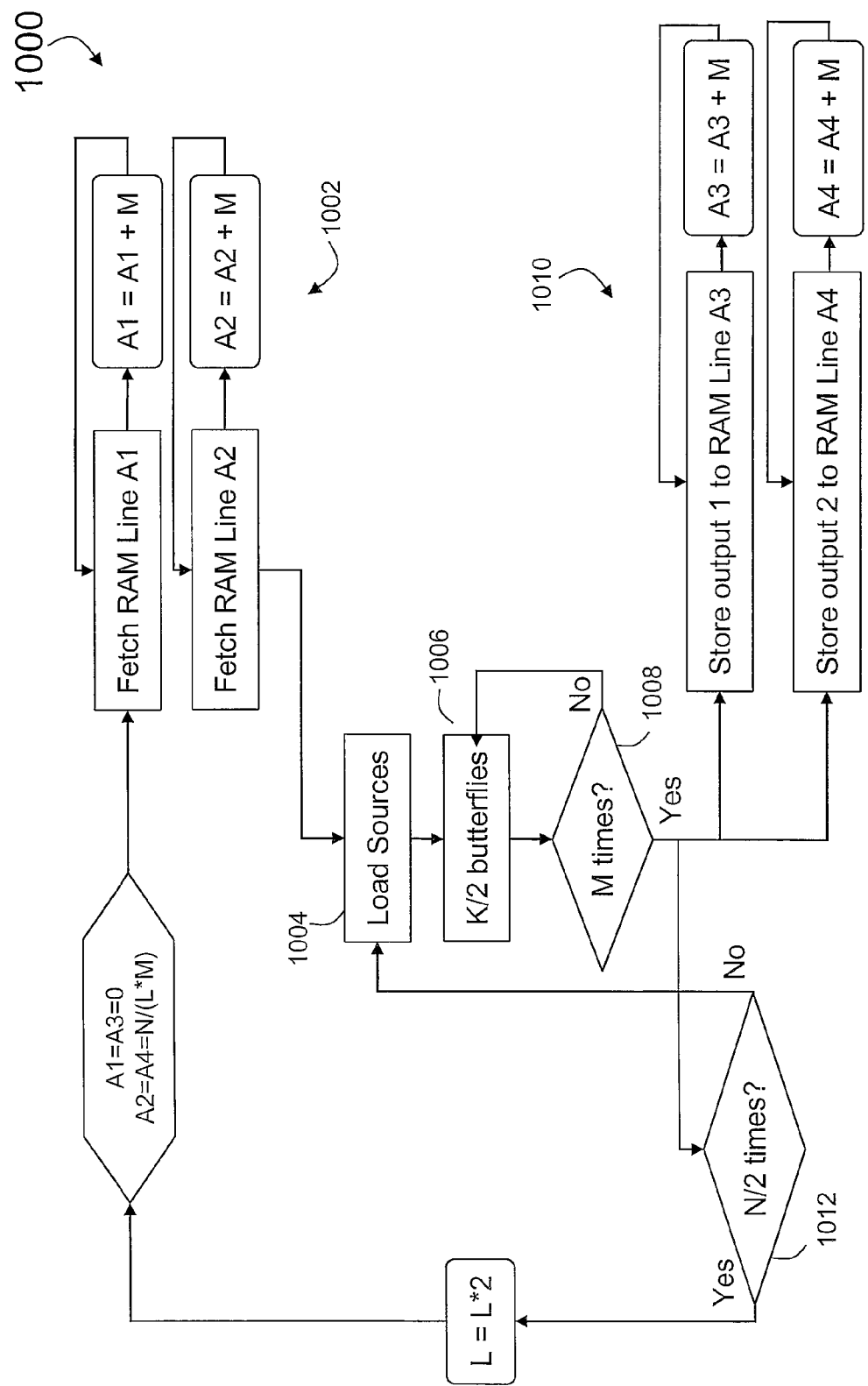
FIG. 10 is a flowchart of a process for fetching input data from a memory to a processor and storing butterfly operation result data to the memory for radix-2 operations implemented on a radix-2 platform, according to an embodiment of the present invention.

With reference to FIG. 10 a flowchart for a process 1000 illustrates operation of one stage of an N-point radix-2 FFT DIF implementation, where N is equal to $2^T$ and T is an integer that corresponds to the number of stages (e.g., a 2048-point radix-2 FFT has eleven stages, a 1024-point radix-2 FFT has ten stages, a 512-point radix-2 FFT has nine stages, etc.). Initially, the process 1000 fetches RAM lines associated with two legs of a butterfly input into respective input registers 1002. In the illustrated case, each pair of RAM lines corresponds to M pairs of input data (e.g., each including a 16-bit real value and a 16-bit imaginary value) for M butterflies as a line of the memory in this example has a length of M. AU source registers are then loaded 1004 with K of the M input (pairs) to facilitate performing K/2 butterflies 1006 in parallel using the K AUs. K/2 butterflies are processed in parallel until all M data pairs are processed 1008. In this case, fetching a next set of data from the memory to the AU source registers is pipelined with loading the AU source registers and performing the K/2 butterflies. Loading of next input data pairs into the input registers is pipelined with storing stage outputs (results) back in memory 1010. Finally, the process 1000 is continued until all N/2 butterflies are completed 1012, where N corresponds to the points in the DFT. In general, all butterfly stages are identical, except that memory fetch/store offsets are modified appropriately for each stage.

Figure 11:
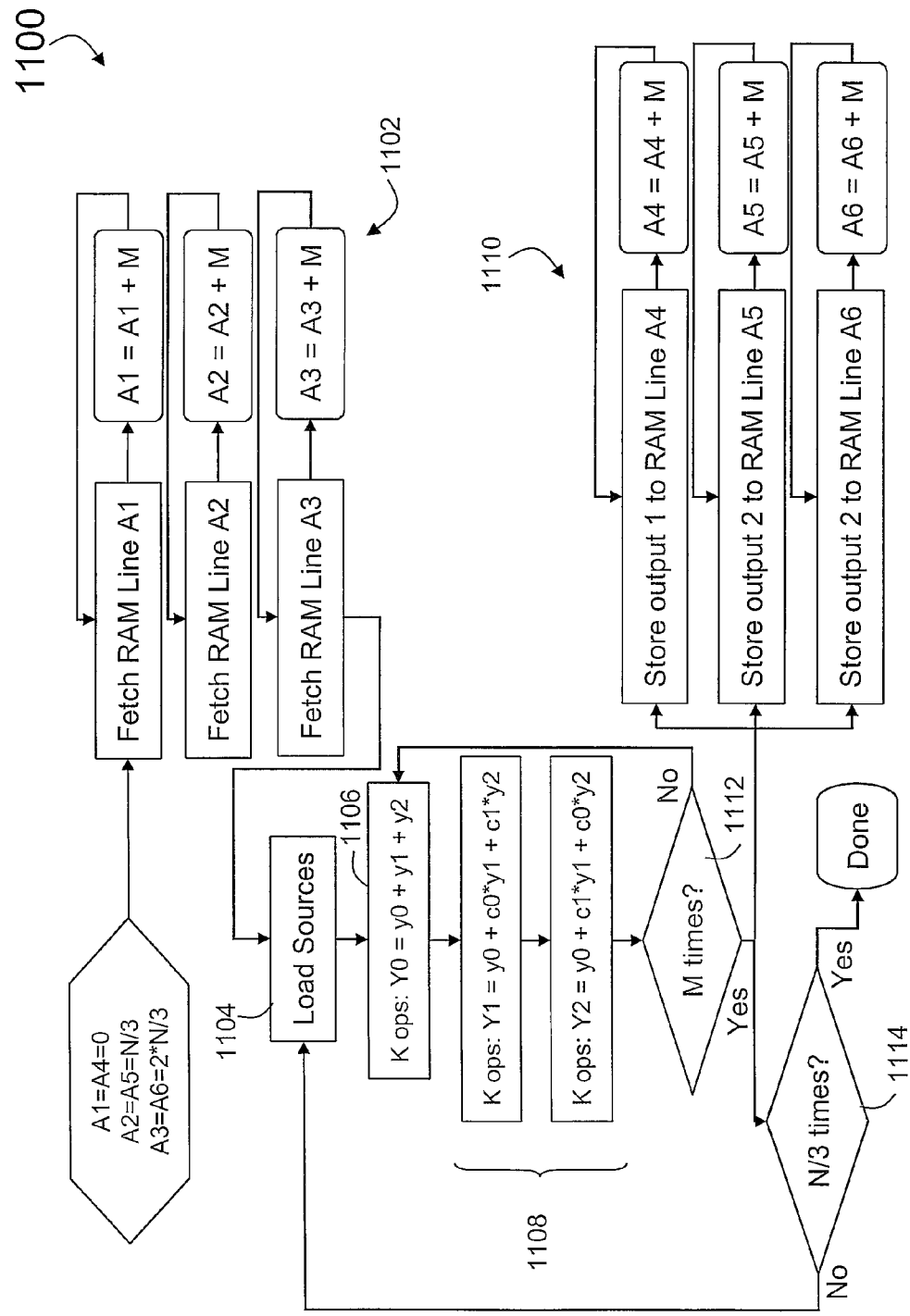
FIG. 11 is a flowchart of a process for fetching input data from a memory to a processor and storing butterfly operation result data to the memory for mixed radix operations implemented on a radix-2 platform, according to another embodiment of the present invention.

With reference to FIG. 11, a flowchart for a process 1100 illustrates operation of one stage of a mixed radix DFT for DFT sizes that have a factor of two (e.g., a 192-point DFT ($192=2^6*3$)). Specifically, a radix-3 implementation is mapped to the same K-parallel execution architecture as the radix-2 butterflies. In the radix-3 implementation, three sets of M inputs are fetched from appropriate locations in memory 1102 and are then loaded into AU source registers 1104. However, instead of completing a 3-point butterfly for each set of the three inputs, a first output leg of a 3-point butterfly is computed for K sets of inputs 1106. Subsequently, second and third output legs for the K sets of inputs are computed 1108. The 3-point butterflies are processed in parallel until all M data pairs are processed 1112. In this case, fetching a next set of data from the memory to the AU source registers is pipelined with loading the AU source registers and performing the 3-point butterflies. Loading of next input sets into the input registers is pipelined with storing stage outputs (results) back in memory 1110. In this case, K outputs are ready after three cycles. As the number of 3-point butterflies is a power of two, the utilization of the AUs is substantially one-hundred percent. The process 1100 proceeds until all N/3 sets of inputs (for a 192-point DFT there are sixty-four sets) have been processed 1114. It should be appreciated that the mixed radix techniques disclosed herein may be extended for any prime factor DFT.

Figure 12:
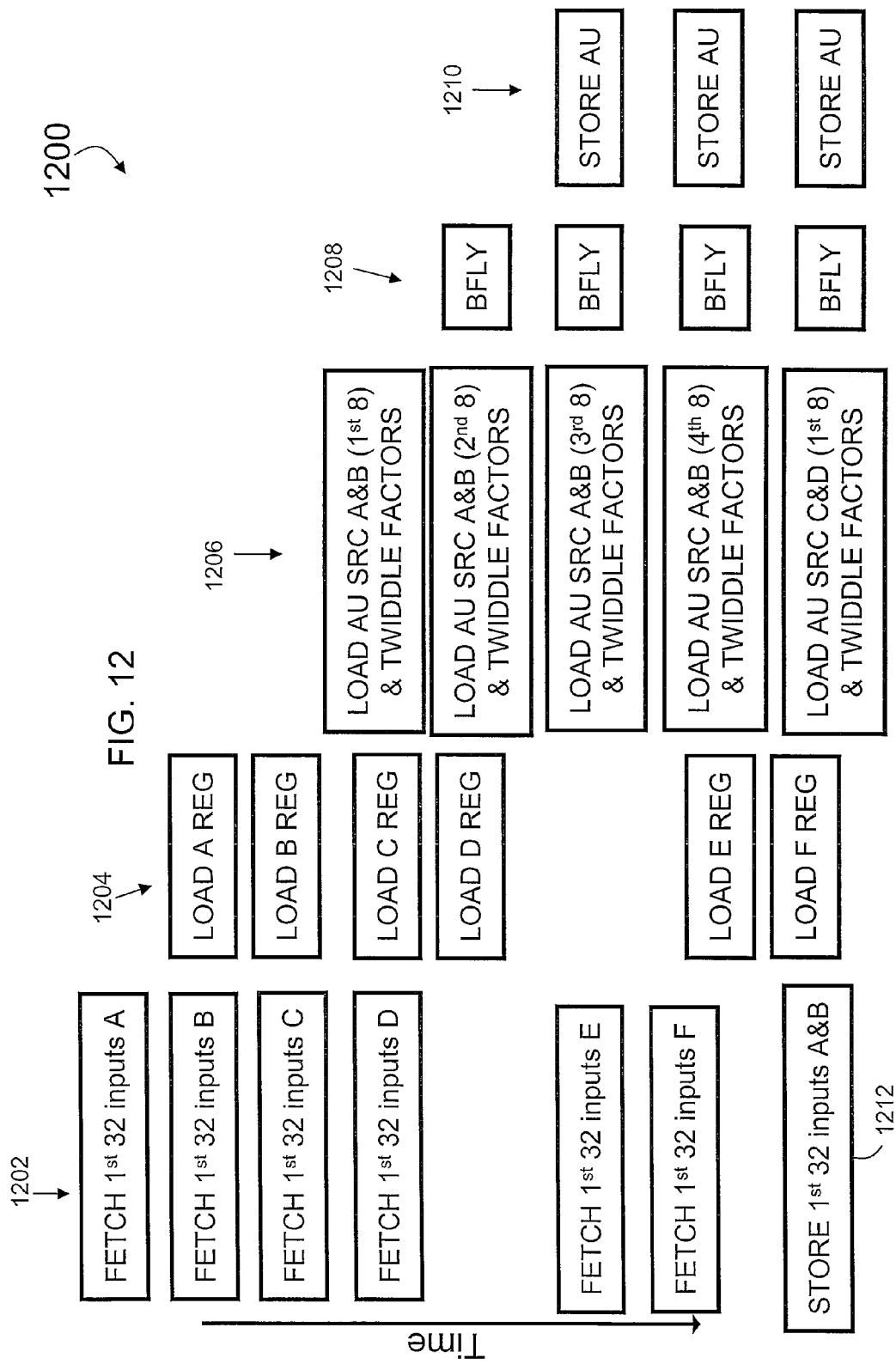
FIG. 12 is a diagram depicting parallelization and pipelining of memory fetches, register loading, butterfly operations, and memory stores, according to an embodiment of the present invention.

With reference to FIG. 12, a diagram 1200 further depicts parallelization and pipelining of memory fetches 1202 and memory stores 1212, input register loading 1204, AU source register loading 1206, butterfly operations 1208, and output register loading 1210, according to an embodiment of the present disclosure. As is illustrated, once input registers A and B have been loaded with input data fetched from memory 1204, the input data and twiddle factors may be loaded into AU source registers 1206 and butterfly operations 1208 may begin. Additional input data may then be fetched from memory and loaded into input registers C and D. Results from the butterfly operations are then stored 1210 in appropriate output registers, which, when full, may be stored in the memory 1212. In this manner, fetches and stores to the memory are interleaved which facilitates the implementation of a single-port memory for input data.

Figure 13:
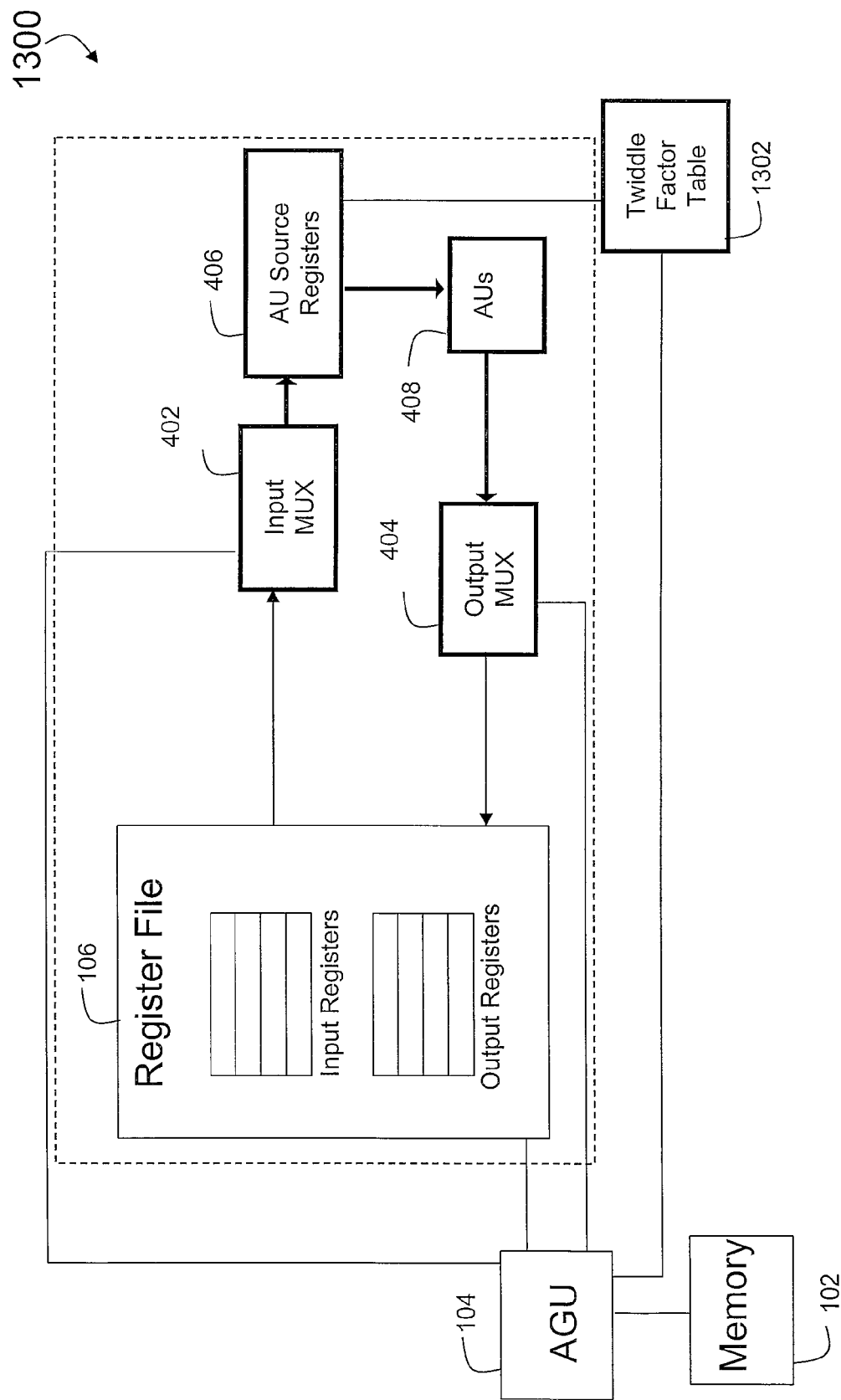
FIG. 13 is a diagram depicting a radix-2 processor platform configured according to an embodiment of the present invention.

With reference to FIG. 13, a processor platform 1300, which is configured according to an embodiment of the present invention, is illustrated. The platform 1300 includes an address generation unit (AGU) 104 that is configured to generate addresses and control signals for accesses to the memory 102. The AGU 104 may also be configured to provide selects signals to the input MUX 402 to select appropriate input data pairs for butterfly operations from the input registers in the register file 106 and to provide selects signals to the output MUX 404 to select appropriate locations in the output registers of the register file 106 for temporary storage of result data pairs provided by the butterfly operations. The AGU 104 may also be configured to select appropriate twiddle factors from a twiddle factor table 1302 based on a DFT stage, in addition to the input data pairs being butterflied. As is illustrated, the input MUX 402 provides the selected input data pairs to appropriate registers within the AU source registers 406, which provides the input data pairs to the AUs for processing. The results of the butterfly operations are provided to the output MUX 404, which, as discussed above, directs each of the results to an appropriate location in an output register.

Figure 14:
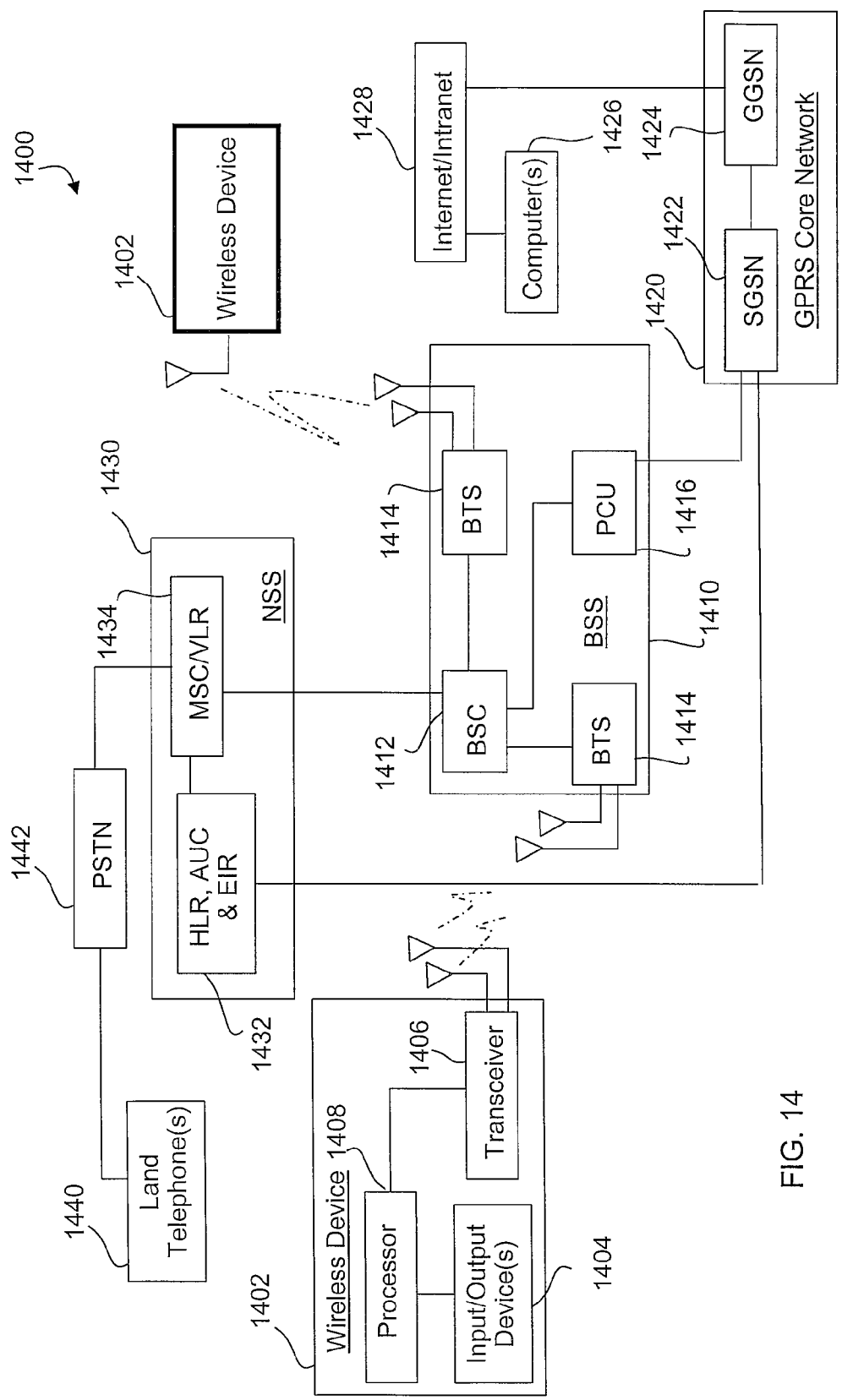
FIG. 14 is a block diagram of an example wireless communication system whose base stations (BSs) and subscriber stations (SSs) may perform discrete Fourier transforms (DFTs) according to various embodiments of the present disclosure.

With reference to FIG. 14, an example wireless communication system 1400 is depicted that includes a plurality of subscriber stations or wireless devices 1402, e.g., hand-held computers, personal digital assistants (PDAs), cellular telephones, etc., that may perform DFTs according to one or more embodiments of the present disclosure. In general, the wireless devices 1402 include one or more processors 1408 (e.g., digital signal processors (DSPs)), a transceiver 406, and one or more input/output devices 404 (e.g., a camera, a keypad, display, etc.), among other components not shown in FIG. 14. The wireless devices 1402 communicate with a base station controller (BSC) 1412 of a base station subsystem (BSS) 1410, via one or more base transceiver stations (BTS) 1414, to receive or transmit voice and/or data and to receive control signals. The BSC 1412 may, for example, employ a scheduler for assigning one or more reference signals (RSs) to each of the wireless devices 1402. In general, the BSC 1412 may also be configured to choose a modulation and coding scheme (MCS) for each of the devices 1402, based on channel conditions.

The BSC 1412 is also in communication with a packet control unit (PCU) 1416, which is in communication with a serving general packet radio service (GPRS) support node (SGSN) 1422. The SGSN 1422 is in communication with a gateway GPRS support node (GGSN) 1424, both of which are included within a GPRS core network 1420. The GGSN 1424 provides access to computer(s) 1426 coupled to Internet/intranet 1428. In this manner, the wireless devices 1402 may receive data from and/or transmit data to computers coupled to the Internet/intranet 1428. For example, when the devices 1402 include a camera, images may be transferred to a computer 1426 coupled to the Internet/intranet 1428 or to another one of the devices 1402. The BSC 1412 is also in communication with a mobile switching center/visitor location register (MSC/VLR) 1434, which is in communication with a home location register (BLR), an authentication center (AUC), and an equipment identity register (EIR) 1432. In a typical implementation, the MSC/VLR 1434 and the HLR, AUC, and EIR 1432 are located within a network and switching subsystem (NSS) 1430, which performs various functions for the system 1400. The SGSN 1422 may communicate directly with the HLR, AUC, and EIR 1432. As is also shown, the MSC/VLR 1434 is in communication with a public switched telephone network (PSTN) 1442, which facilitates communication between wireless devices 1402 and land telephone(s) 1440.

Accordingly, a number of techniques have been disclosed herein that facilitate efficient implementation of a discrete Fourier transform (DFT) on a radix-2 platform irrespective of whether the DFT is a mixed radix DFT. The techniques advantageously parallelize and pipeline memory fetches, register loading, butterfly operations, and memory stores.

As may be used herein, a software system can include one or more objects, agents, threads, subroutines, separate software applications, two or more lines of code or other suitable software structures operating in one or more separate software applications, on one or more different processors, or other suitable software architectures.

As will be appreciated, the processes in preferred embodiments of the present invention may be implemented using any combination of computer programming software, firmware or hardware. As a preparatory step to practicing the invention in software, the computer programming code (whether software or firmware) according to a preferred embodiment will typically be stored in one or more machine readable storage mediums such as fixed (hard) drives, diskettes, optical disks, magnetic tape, semiconductor memories such as read-only memories (ROMs), programmable ROMs (PROMs), etc., thereby making an article of manufacture in accordance with the invention. The article of manufacture containing the computer programming code is used by either executing the code directly from the storage device, by copying the code from the storage device into another storage device such as a hard disk, random access memory (RAM), etc., or by transmitting the code for remote execution. The method form of the invention may be practiced by combining one or more machine-readable storage devices containing the code according to the present invention with appropriate standard computer hardware to execute the code contained therein. An apparatus for practicing the invention could be one or more computers and storage systems containing or having network access to computer program(s) coded in accordance with the invention.

Although the invention is described herein with reference to specific embodiments, various modifications and changes can be made without departing from the scope of the present invention as set forth in the claims below. For example, many of the techniques disclosed herein are broadly applicable to a variety of different communication systems. Accordingly, the specification and figures are to be regarded in an illustrative rather than a restrictive sense, and all such modifications are intended to be included with the scope of the present invention. Any benefits, advantages, or solution to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for performing a discrete Fourier transform on a radix-2 platform, comprising:
   storing, in a single-port memory, multiple signal points;
   fetching a first group of consecutive ones of the multiple signal points, from a first line of the single-port memory, to a first input register associated with a processor, wherein the processor includes multiple arithmetic units that are each configured to perform multiply accumulate operations;
   fetching a second group of consecutive ones of the multiple signal points, from a second line of the single-port memory, to a second input register associated with the processor;
   loading selected pairs of the multiple signal points into the multiple arithmetic units during an initial butterfly stage, wherein each of the selected pairs includes one of the multiple signal points from the first input register and one of the multiple signal points from the second input register; and
   performing butterfly operations in parallel on the selected pairs of the multiple signal points using the multiple arithmetic units to provide respective first output elements during the initial butterfly stage, wherein the butterfly operations are radix-M butterfly operations and M is a prime factor not equal to two, and wherein the multiple arithmetic units exhibit substantially one-hundred percent utilization during the butterfly operations by computing a first output point for each said radix-M butterfly operation, and subsequently computing the other output points for said radix-M operation.

2. The method of claim 1, wherein the radix-2 platform is configured as a decimation-in-frequency implementation.

3. The method of claim 1, further comprising:
   storing, during the initial butterfly stage, first ones of the respective first output elements in selected locations in a first output register and second ones of the respective first output elements in selected locations in a second output register; and
   storing, in the single-port memory, the first ones of the respective first output elements in the first output register and the second ones of the respective first output elements in the second output register.

4. The method of claim 3, wherein the first ones of the respective first output elements are stored in the first line and the second ones of the respective first output elements are stored in the second line.

5. The method of claim 3, wherein the first ones of the respective first output elements are stored in a third line of the single-port memory and the second ones of the respective first output elements are stored in a fourth line of the single-port memory.

6. The method of claim 3, further comprising:
   fetching a first group of consecutive ones of the respective first output elements, from the single-port memory, to the first input register;
   fetching a second group of consecutive ones of the respective first output elements, from the single-port memory, to the second input register;
   loading selected pairs of the respective first output elements, from the first input register, into the multiple arithmetic units during at least one intermediate butterfly stage, wherein the at least one intermediate butterfly stage is subsequent to the initial butterfly stage;

loading selected pairs of the respective first output elements, from the second input register, into the multiple arithmetic units during the at least one intermediate butterfly stage; and performing butterfly operations on the selected pairs of the respective first output elements using the multiple arithmetic units to provide respective second output elements during the at least one intermediate butterfly stage.

7. The method of claim 6, further comprising:

storing, during the at least one intermediate butterfly stage, first ones of the respective second output elements in selected locations in the first output register and second ones of the respective second output elements in selected locations in the second output register; and storing, in the single-port memory, the first ones of the respective second output elements in the first output register and the second ones of the respective second output elements in the second output register.

8. The method of claim 7, wherein the first ones of the respective second output elements are stored in the first line and the second ones of the respective second output elements are stored in the second line.

9. The method of claim 7, wherein the first ones of the respective second output elements are stored in a third line of the single-port memory and the second ones of the respective second output elements are stored in a fourth line of the single-port memory.

10. The method of claim 7, further comprising:

fetching a first group of consecutive ones of the respective second output elements, from the single-port memory, to the first input register;

fetching a second group of consecutive ones of the respective second output elements, from the single-port memory, to the second input register;

loading selected pairs of the respective second output elements, from adjacent locations in the first input register, into the multiple arithmetic units during a final butterfly stage, wherein the final butterfly stage is subsequent to the at least one intermediate butterfly stage;

loading selected pairs of the respective second output elements, from adjacent locations in the second input register, into the multiple arithmetic units during the final butterfly stage; and performing butterfly operations on the selected pairs of the respective second output elements using the multiple arithmetic units to provide respective third output elements during the final butterfly stage.

11. The method of claim 10, further comprising:

storing, during the final butterfly stage, the respective third output elements associated with the first input register in selected adjacent locations in the first output register;

storing, during the final butterfly stage, the respective third output elements associated with the second input register in selected adjacent locations in the second output register; and storing, in the single-port memory, the respective third output elements in the first output register and the respective third output elements in the second output register.

12. The method of claim 1, wherein the first and second groups each include thirty-two of the multiple signal points.

13. A method for performing a discrete Fourier transform on a radix-2 platform, comprising:

storing, in a single-port memory, multiple signal points;

fetching a first group of consecutive ones of the multiple signal points, from a first line of the single-port memory, to a first input register associated with a processor, wherein the processor includes multiple arithmetic units that are each configured to perform multiply accumulate operations;

fetching a second group of consecutive ones of the multiple signal points, from a second line of the single-port memory, to a second input register associated with the processor;

loading selected pairs of the multiple signal points, from adjacent locations in the first input register, into the multiple arithmetic units during an initial butterfly stage;

loading selected pairs of the multiple signal points, from adjacent locations in the second input register, into the multiple arithmetic units during the initial butterfly stage; and performing butterfly operations in parallel on the selected pairs of the multiple signal points using the multiple arithmetic units to provide respective first output elements during the initial butterfly stage, wherein the butterfly operations are radix-M butterfly operations and M is a prime factor not equal to two, and wherein the multiple arithmetic units exhibit substantially one-hundred percent utilization during the butterfly operations by computing a first output point for each said radix-M butterfly operation, and subsequently computing the other output points for said radix-M operation.

14. The method of claim 13, wherein the radix-2 platform is configured as a decimation-in-time implementation.

15. The method of claim 13, further comprising:

storing, during the initial butterfly stage, first ones of the respective first output elements in selected locations in a first output register and second ones of the respective first output elements in selected locations in a second output register; and storing, in the single-port memory, the first ones of the respective first output elements in the first output register and the second ones of the respective first output elements in the second output register.

16. The method of claim 15, further comprising:

fetching a first group of consecutive ones of the respective first output elements, from the single-port memory, to the first input register;

fetching a second group of consecutive ones of the respective first output elements, from the single-port memory, to the second input register;

loading selected pairs of the respective first output elements, from the first input register, into the multiple arithmetic units during at least one intermediate butterfly stage, wherein the at least one intermediate butterfly stage is subsequent to the initial butterfly stage;

loading selected pairs of the respective first output elements, from the second input register, into the multiple arithmetic units during the at least one intermediate butterfly stage; and performing butterfly operations on the selected pairs of the respective first output elements using the multiple arithmetic units to provide respective second output elements during the at least one intermediate butterfly stage.

17. The method of claim 16, further comprising:

storing, during the at least one intermediate butterfly stage, first ones of the respective second output elements in selected locations in the first output register and second ones of the respective second output elements in selected locations in the second output register; and storing, in the single-port memory, the first ones of the respective second output elements in the first output register and the second ones of the respective second output elements in the second output register.

18. The method of claim 17, further comprising:

fetching a first group of consecutive ones of the respective second output elements, from the single-port memory, to the first input register;

fetching a second group of consecutive ones of the respective second output elements, from the single-port memory, to the second input register;

loading selected pairs of the respective second output elements into the multiple arithmetic units during at least one final butterfly stage, wherein the at least one final butterfly stage is subsequent to the at least one intermediate butterfly stage and each of the selected pairs includes one of the respective second output elements from the first input register and one of the respective second output elements from the second input register; and performing butterfly operations on the selected pairs of the respective second output elements using the multiple arithmetic units to provide respective third output elements during the at least one final butterfly stage.

19. The method of claim 18, further comprising:

storing, during the final butterfly stage, the respective third output elements associated with the first input register in selected adjacent locations in the first output register;

storing, during the final butterfly stage, the respective third output elements associated with the second input register in selected adjacent locations in the second output register; and storing, in the single-port memory, the respective third output elements in the first output register and the respective third output elements in the second output register.

20. A method for performing a discrete Fourier transform on a radix-2 platform, comprising:

storing, in a single-port memory, multiple signal points;

fetching a first group of consecutive ones of the multiple signal points, from the single-port memory, to a first input register associated with a processor, wherein the processor includes multiple arithmetic units that are each configured to perform multiply accumulate operations;

fetching a second group of consecutive ones of the multiple signal points, from the single-port memory, to a second input register associated with the processor;

loading selected pairs of the multiple signal points into the multiple arithmetic units during a butterfly stage, wherein each of the selected pairs includes one of the multiple signal points from the first input register and one of the multiple signal points from the second input register; and performing butterfly operations in parallel on the selected pairs of the multiple signal points using the multiple arithmetic units to provide respective first output elements during the initial butterfly stage, wherein the butterfly stage corresponds to one or more initial butterfly stages having one or more subsequent butterfly stages when the radix-2 platform is configured as a decimation-in-frequency implementation or one or more final butterfly stages having one or more prior butterfly stages when the radix-2 platform is configured as a decimation-in-time implementation, and wherein the discrete Fourier transform is a mixed radix discrete Fourier transform and the butterfly operations are radix-M butterfly operations, where M is a prime factor and a size of the mixed radix discrete Fourier transform corresponds to $M*K$, and where K is a power of 2 and the multiple arithmetic units exhibit substantially one-hundred percent utilization during the butterfly operations by computing a first output point for each said radix-M butterfly operation, and subsequently computing the other output points for said radix-M operation.

21. The method of claim 20, further comprising:

representing the radix-M butterfly operations as M-1 of the multiply accumulate operations.

22. The method of claim 21, further comprising:

processing the radix-M butterfly operations in batches of L, where L is a power of 2 and corresponds to a maximum number of the multiply accumulate operations that can be performed in parallel on the multiple arithmetic units.

23. The method of claim 21, wherein the mixed radix discrete Fourier transform includes multiple prime factors each of which corresponds to respective radix-M butterfly operations and the method further comprises:

processing each of the respective radix-M butterfly operations in batches of L, where L is a power of 2and corresponds to a maximum number of the multiply accumulate operations that can be performed in parallel on the multiple arithmetic units.

* * * * *